United States Patent [19]

Spieth

[11] 4,025,214
[45] May 24, 1977

[54] CLAMPING DEVICE

[76] Inventor: Rudolf Spieth, Kennenburger Strasse 42, D 73 Esslingen (Neckar)-Kennenburg, Germany

[22] Filed: Jan. 16, 1976

[21] Appl. No.: 649,677

[30] Foreign Application Priority Data

Feb. 21, 1975 Germany .......................... 2507456

[52] U.S. Cl. ................................ 403/370; 403/372
[51] Int. Cl.² .......................................... F16B 2/04
[58] Field of Search .................... 403/370, 371, 372

[56] References Cited

UNITED STATES PATENTS

| 3,433,514 | 12/1968 | Feighofen | 403/370 |
| 3,578,364 | 5/1971 | Ehrenberg | 403/370 |
| 3,664,692 | 3/1972 | Spieth | 403/370 |

FOREIGN PATENTS OR APPLICATIONS

| 869,892 | 3/1953 | Germany | 403/372 |

Primary Examiner—Wayne L. Shedd
Attorney, Agent, or Firm—Roylance, Abrams, Berdo & Kaul

[57] ABSTRACT

A radially deformable clamping device including a cylindrical body having a central bore, a pair of inwardly extending annular grooves near the ends of the body and a pair of annular grooves extending outwardy from the central bore and spaced inwardly of the first pair of grooves. The grooves define a central portion and flexible zones to permit the central portion to be radially deformed. A plurality of equally spaced concentric axial bores extend from one end face of the body through the central portion. Slots extend between the plurality of bores and the central bore in the central portion. The bushing can be applied around the mandrel having a shoulder and a threaded end with a nut, the body being axially compressed between the shoulder and nut to cause radial deformation. A pin can be provided in one of the bores to prevent rotation of the body. In another embodiment, the plurality of bores extend entirely through the body and receive screws or bolts to cause the axial compression.

10 Claims, 5 Drawing Figures

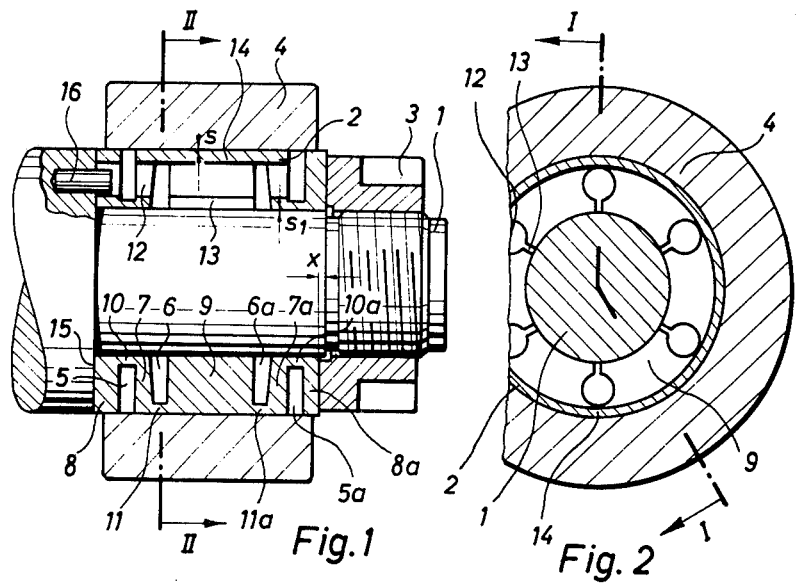
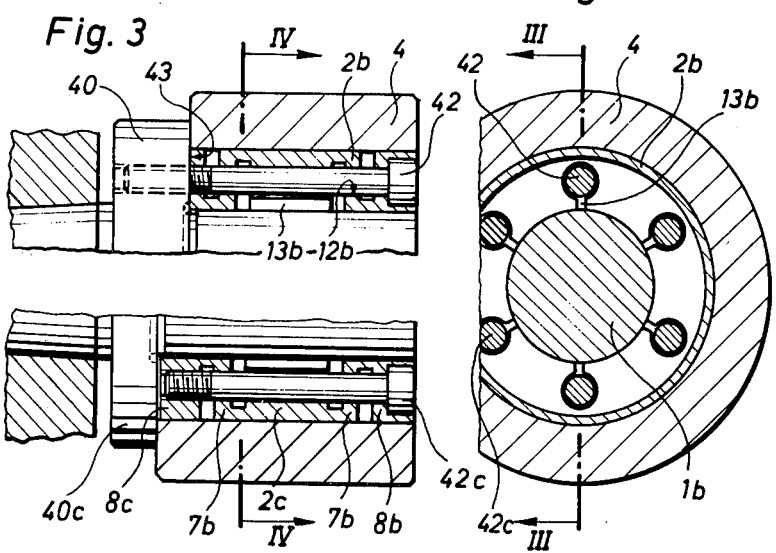

CLAMPING DEVICE

This invention relates to axially compressible, radially deformable clamping devices.

Clamping devices of the general type treated herein in which a generally cylindrical body is provided with internal and external grooves have been previously disclosed in German Pat. No. 828,627, and in U.S. Pat. Nos. 3,168,338 and 3,667,525, all in the name of the present inventor. In such clamping devices of this general category, the portion which accomplishes the clamping is relatively small or does not move in a uniform fashion so that clamping occurs only at jointed portions adjacent the annular grooves. When this occurs, relatively high clamping pressures exist on small surface areas. Thus, when workpieces are frequently changed, considerable wear and disruption of the surfaces results.

An object of the present invention is to provide an improved clamping device in which a central annular portion of the clamping body participates in the clamping process. Briefly described, the invention includes a substantially cyclindrical clamping bushing having a central bore, means defining first and second pairs of annular grooves in the bushing, one groove of each pair extending radially inwardly from the outer surface of the bushing and the other groove of each pair extending radially outwardly from the central bore, the grooves of each pair being axially spaced apart to define first and second bridge portions therebetween, the radial limits of the grooves forming flexible zones to render the bushing axially elastic, and the pairs of grooves being axially spaced apart to define a central annular portion having an axial dimension at least as great as the axial dimensions of the grooves and the bridge portions. The device further includes means defining a plurality of bores extending axially into the bushing and through the central portion, the bores being disposed concentrically with respect to the central axis of the bushing and being equally circularly spaced apart, and means defining slot-like openings in the central portion between the central bore and each of the plurality of bores, so that, upon axial compression of the bushing, the central annular portion radially deforms.

The bores present in the annular portion make possible the deformation during the clamping process. As a result of this, a large surface contact of the clamping bushing in its central region results. The uniform distribution of the bores leads to a precise and uniform contact of the clamping bushing and to an increased precision of accommodation of the workpieces. Moreover, the wear, in the case of frequent changing of the workpieces, is greatly diminished.

In an embodiment in which the plural bores are blind bores extending inwardly from one end, and wherein the device is provided with means to prevent rotation of the bushing, the installation of the clamping bushing in a correct position is assured and rotation is positively prevented. In the embodiment in which screw means are employed to apply the axial force, uniform introduction of the clamping force is applied and no shifting in the area of the central annular portion results.

In a further embodiment, the bridge portion at one end of the bushing is thicker than the other, permitting the clamping to occur first at one end of the bushing and then at the other, so that, when the bushing is applied in a position abutting a shoulder stop, that portion can be first clamped so that all axial movement occurs at the other end which is subsequently tightened.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a side elevation, in partial section, of a device according to the invention showing, in the upper portion, the bushing in its relaxed state, and, in the lower portion, the bushing in its axially compressed state;

FIG. 2 is a section along lines II—II of FIG. 1;

FIG. 3 is a longitudinal section of the upper half of a further embodiment of the invention;

FIG. 4 is a section along lines IV—IV of FIG. 3; and

FIG. 5 is a longitudinal section of the lower half of a bushing according to a further embodiment of the subject invention.

As shown in FIG. 1, a mandrel 1 is provided at one end with external threads and a smooth portion terminating in a shoulder 15. A clamping bushing 2 in accordance with the invention surrounds the smooth portion of the mandrel with a clearance S1 and is, in turn, surrounded by a workpiece 4 which is indicated as being a simple cylindrical body which is to be fixedly attached by the clamping device to the mandrel. In the relaxed, unclamped condition, there exists a small clearance S between the outer surface of clamping bushing 2 and the inner surface of workpiece 4.

Bushing 2 is provided near its ends will grooves 5 and 5a which extend radially inwardly from the outer surface of the bushing. Closely spaced inwardly thereof are grooves 6 and 6a which extend radially outwardly from the central bore through the bushing. Bridge portions 7 and 7a lie between and are defined by grooves 5 and 6 and grooves 5a and 6a, respectively. Grooves 6 and 6a are, shown in FIG. 1, generally wedge-shaped, that is, these radially outwardly extending grooves are inwardly tapered in the direction of their cut away from the central bore of the bushing. Thus, the bridge portions defined thereby are also wedge-shaped or tapered with the wedge decreasing in the direction from the outer surface to the inner surface of the bushing. Grooves 5 and 5a define flange portions 8 and 8a at the ends of the bushing. Between grooves 6 and 6a, there is provided a central annular portion 9.

As shown in the upper portion of FIG. 1, the portions 7, 8, 9, 7a and 8a in the unclamped state have the same inner and outer diameters, the portion normally being produced from a single length of pipe or tubular stock. The flanges 8 and 8a and the annular grooves 5, 5a, 6 and 6a are dimensioned to be approximately equal in axial dimension to each other. The central annular portion 9 can be of about the same axial dimension as flange 8a, but can also be significantly longer as shown in FIG. 1. Bridge portion 7a is significantly wider than bridge portion 7.

Because of the manner in which grooves 5 and 6 and grooves 5a and 6a are cut, there are defined a series of flexible zones or articulation regions 10, 11, 10a and 11a which extend annularly around the respective portions of the bushing.

Because of the fact that bridge portion 7 is axially thinner than bridge portion 7a, when the body is axially compressed, the flexible zones 10 and 11 will flex sooner than zones 10a and 11a so that the portion of the clamping bushing closest to shoulder 15 will be radially deformed and clamped sooner than at the opposite end of the bushing.

As also shown in FIG. 1, bushing 2 is provided with a plurality of bores or blind holes 12 which are disposed on a circle concentric with the central axis of the bushing and are equally circularly spaced, as shown in FIG. 2. Holes 12 extend through flange 8, through bridges 7 and 7a and through central annular portion 9. The bores 12 are caused to communicate with the central bore of the bushing in the region of central annular portion 9 through a plurality of radial slots 13. Alternatively, the bores 12 can be in direct connection with the central bore through the clamping bushing by forming the bores in portion 9 as simply U-shaped indentations opening toward the central bore. Between the outer surface of bushing 2 and each bore 12 is a moving joint 14 extending in parallel to the axial direction which has remained intact.

Clamping bushing 2 with its flange 8 is in contact with shoulder 15 of the clamping mandrel 1. A locating or safety pin 16 is inserted into an opening in shoulder 15, which pin is intended for engagement with one of bores 12 of bushing 2. This pin establishes the rotational position of bushing 2 and the correct position of insertion of bushing 2 onto the mandrel, and prevents subsequent rotary movement of bushing 2 with respect to the mandrel.

In order to clamp the members together, a nut 3 is threaded onto the threaded end of mandrel 1, the nut being provided with an indentation at the inner end thereof to avoid conflict with the smooth portion of the mandrel. The workpiece 4 is placed around the clamping bushing with a clearance S existing therebetween. Nut 3 is then rotated to move the inner surface thereof a distance $x$, causing the bushing to be axially compressed by that amount, as shown in the lower portion of FIG. 1. The end portion of the smooth part of the mandrel extends into the recess in the nut and the bushing is distorted or deformed, causing flexure of joints 10 and 10a and 11 and 11a, causing the outer surface of annular portion 9 to press against the inner surface of workpiece 4. The clearances are then eliminated and workpiece 4 is securely attached to the mandrel. To remove the workpiece it is necessary only to reverse the direction of clamping nut 3.

A second embodiment of an apparatus according to the invention is shown in FIGS. 3 and 4 wherein the clamping mandrel 1b has a collar 40 with an end face or shoulder 43. The clamping bushing 2b, which is provided with inwardly and outwardly extending grooves in a manner similar to the embodiment of FIG. 1, can be axially compressed and tightened by means of tightening screws 42 which are provided with cap heads having conventional hexagonal or allen sockets therein. Screws 42 extend through bores 12b which are evenly circularly spaced on a circle concentric with the central axis of the bushing. The heads of the screws rest in indentations in the flange 8b of the bushing. The threaded ends of screws 42 engage threaded openings in collar 40. As in the case of the embodiment of FIG. 1, the bridge 7b of bushing 2b closest to collar 40 can be thinner than the equivalent bridge at the other end of the bushing. Thus, during the clamping process, bushing 2b is pressed firmly against face 43 of collar 40 and the screws are tightened. As in the embodiment of FIG. 1, the portions of opening 12b in the central annular portion of the bushing communicate with the central bore through the bushing through slots 13b.

A third embodiment of the invention is shown in FIG. 5 wherein a flange 8c is axially thicker than the equivalent flange in the other embodiments and, thus, the entire bushing has a greater axial dimension. Collar 40c is therefore thinner than collar 40. The tightening screws 42c extend through the axial bores and are screwed into internally threaded portions of those bores in flange 8c. Alternatively, it would be possible to provide threaded nuts at the end adjacent flange 8c to engage the threaded ends of the screws. It will be observed that in the embodiment of FIG. 5, it is not necessary to construct the bridges variably since the clamping bushing is compressed evenly from both ends.

It will be recognized that a clamping arrangement employing the principles described in connection with the foregoing embodiments can be employed in the reverse clamping operation, i.e., as a chuck for the reception of a mandrel. In this case, the various portions are essentially reversed, the annular portion being on the inside periphery and the annular grooves in the opposite configuration from those shown. It will also be recognized that it is possible to dispose two clamping bushions immediately end-to-end, or side-by-side, and to manufacture them as one continuous piece, in which case the bridges disposed between the annular portion would remain intact but the flanges would be omitted.

It is also possible to fix the clamping bushing only on its outside or on its inside periphery and to maintain on the other side a certain clearance between the body seated on the outside periphery or on the inside periphery, whereby, preferably, the articulated portions, or moving joints, extending in the direction of a periphery are developed differently on the outside and on the inside.

While certain advantageous embodiments have been chosen to illustrate the invention, it will be understood by those skilled in the art that various changes and modifications can be made therein without departing from the scope of the invention as defined in the appended claims.

What is claimed is:

1. A radially deformable clamping device comprising a substantially cylindrical clamping bushing having an outer surface and an inner surface defining a central bore;
   means defining first and second pairs of annular grooves in said bushing,
      one groove of each pair extending radially inwardly from said outer surface and the other groove of each pair extending radially outwardly from said inner surface,
   said grooves of each pair being axially spaced apart to define first and second bridge portions therebetween, the radial limits of said grooves forming flexible zones to render said bushing axially elastic, and
   said pairs of grooves being axially spaced apart to define a central annular portion having an axial dimension at least as great as the axial dimensions of said grooves and said bridge portions;
   means defining a plurality of bores extending axially into said bushing and through said central portion, said bores being disposed concentrically with respect to the central axis of said bushing and being equally circularly spaced apart; and means defining a plurality of axially extending slot-like openings in said central portion, each of said slot-like openings being associated with one of said plurality of bores and extending radially between its associated bore and one of said surfaces, said annular groove of each pair which is closest to said slot-like openings extending radially from the same one of said surfaces to which said slot-like openings extend whereby, upon axial compression of said bushing, said central annular portion radially deforms.

2. A device according to claim 1 wherein one of said first and second bridge portions has a greater axial dimension than the other.

3. A device according to claim 1 wherein said radially outwardly extending groove of each pair is inwardly tapered away from said bore.

4. A device according to claim 1 wherein each of said plurality of bores is a blind bore extending into said bushing from the same end, said device further including means in at least one of said plurality of bores for engaging a support body and preventing rotation of said bushing.

5. A device according to claim 1 wherein said slot-like openings extend between said plurality of bores and said inner surface, said device further comprising
a support mandrel having a portion extending through said central bore, a shoulder portion abutting one end of said bushing and a threaded portion protruding beyond the other end of said bushing; and
a nut threadedly engaging said threaded portion,
said nut having a surface abutting said other end so that rotation of said nut in one direction axially compresses said bushing between said shoulder portion and said surface to cause outward radial deformation of said central portion.

6. A device according to claim 5 wherein each of said plurality of bores is a blind bore, said device further comprising means in at least one of said plurality of bores for engaging said shoulder to prevent rotation of said bushing.

7. A device according to claim 1 wherein each of said plurality of bores extends entirely through said bushing, said device further comprising
screw means in said plurality of bores for axially compressing said bushing.

8. A device according to claim 7 wherein one of said first and second bridge portions has a greater axial dimension than the other.

9. A device according to claim 7 wherein at least an end portion of each of said plurality of bores is internally threaded to engage said screw means.

10. A device according to claim 1 wherein said radially inwardly extending grooves are located closer to the ends of said bushing than said radially outwardly extending grooves, and said slot-like openings extend radially between said plurality of bores and said inner surface.

* * * * *